United States Patent [19]

Yoshida

[11] Patent Number: 5,072,249
[45] Date of Patent: Dec. 10, 1991

[54] DIAPHRAGM DEVICE
[75] Inventor: Setsuo Yoshida, Tokyo, Japan
[73] Assignee: Canon Kabushiki Kaisha, Tokyo, Japan
[21] Appl. No.: 440,645
[22] Filed: Nov. 24, 1989
[30] Foreign Application Priority Data
Nov. 28, 1988 [JP] Japan ................................ 63-300196
Mar. 15, 1989 [JP] Japan .................................. 1-063096
[51] Int. Cl.$^5$ ............................................. G03B 9/02
[52] U.S. Cl. ................................................. 354/274
[58] Field of Search .................... 354/274, 270, 271.1, 354/272, 273; 350/449, 450

[56] References Cited
U.S. PATENT DOCUMENTS
3,055,282 9/1962 Baur et al. ........................... 354/274

*Primary Examiner*—L. T. Hix
*Assistant Examiner*—Khanh Dang
*Attorney, Agent, or Firm*—Fitzpatrick, Cella, Harper & Scinto

[57] ABSTRACT

A diaphragm device of reduced diameter in the entirety comprising a base plate having a substantially round central opening, first diaphragm blades whose one ends are supported about respective pivot pins on the base plate, a first member arranged to turn all the first diaphragm blades about the pivot pins, the same number of second diaphragm blades as that of the first diaphragm blades arranged in confronting relation to the first diaphragm blades and whose one ends are supported about respective pivot pins on the base plate, and a second member arranged to turn all the second diaphragm blades about the pivot pins.

7 Claims, 6 Drawing Sheets

B

A

DIAPHRAGM DEVICE

BACKGROUND OF THE INVENTION

1. Field of the Invention

This invention relates to diaphragm devices for photographic cameras, video cameras, and the like.

2. Description of the Related Art

To begin, FIG. 10 to FIG. 12 show the conventional diaphragm device of a lens for a camera. A plurality of diaphragm blades 50 each have a pin 51 called the "fixed dowel" formed on one surface thereof, and another pin 52 called the "rotating dowel" formed on the other surface thereof. A diaphragm blade receptor 53 called the "beehive" (having a round opening 54 with its center at the optical axis) is provided with an equal number of holes 55 to the number of diaphragm blades 50 and accommodates the plurality of diaphragm blades 50 in such a way that the pins 51 are rotatably formed in the respective holes 55. A cam member 56 (having a round opening 57 with its center at the optical axis) also is accommodated in the interior of the diaphragm blade receptor 53. In the cam member 56 there are cut camming slots 58 for guiding the respective pins 52.

Therefore, when the diaphragm blade receptor 53 and the cam member 56 are rotated about the optical axis relative to each other, all the pins 52 move along the respective camming slots 58, while turning all the diaphragm blades 50 about the respective pins 51 in a space between the receptor 53 and the cam member 56. Depending on the overlapping amount of the turned diaphragm blades 50, the size of the opening of the aperture formed at the center by the inner edges of the diaphragm blades 50 is caused to vary. In such a manner, the amount of light passing through the aperture opening is adjusted.

Incidentally, in such a conventional diaphragm device, for the width W of the blade, determination of its value is made so that as the stopping down goes even to the minimum, light does not leak from any of the other edge portions than those defining the aperture opening. In other words, the blade in single form has to have both the function of determining the diameter of the aperture opening and the function of preventing light leakage at any point in the area other than the aperture opening. Because of this, the prior art could not reduce the width of the diaphragm blade to more than a certain extent.

For this reason, a much desired reduction of the size of the diaphragm blade receptor and the cam member, too, could not be done. This leads to the impossibility of reducing the outer diameter of the casing for the lens mounting having the diaphragm device incorporated therein any farther, thus giving one cause for inhibiting minimization of the size and weight of the lens barrel.

SUMMARY OF THE INVENTION

A first object of the invention is to minimize the size of the diaphragm device and, particularly, to reduce its diameter.

A second object of the invention is to provide a diaphragm device with means making it possible to prevent light from leaking from any of the other portions than the aperture opening even at the time of the smallest size thereof.

And, in the invention, a diaphragm device is made with inclusion of a base plate having a substantially round central opening, first diaphragm blades each of which is pivotally supported at its one end by the base plate, a first member for causing each of the first diaphragm blades to pivotally rotate, second diaphragm blades arranged opposite to the first diaphragm blades and having the same number as that of the first diaphragm blades, each of the second diaphragm blades being pivotally supported at its one end by the base plate, and a second member for causing each of the second diaphragm blades to pivotally rotate.

DETAILED DESCRIPTION OF THE PREFERRED EMBODIMENTS

The present invention is next described in connection with embodiments thereof.

Figure 1:
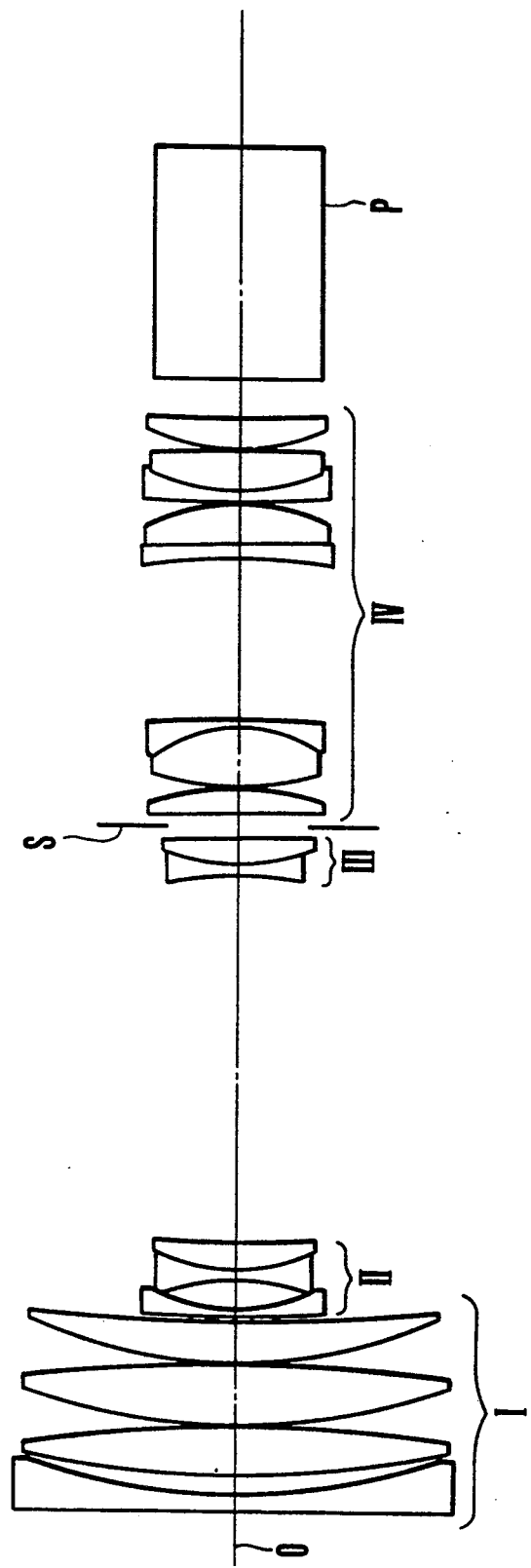
FIG. 1 is a longitudinal sectional view of an optical system with which the invention is concerned.

FIG. 1 is a sectional view showing the entirety of an optical system concerning the invention. A first lens group I having a positive refractive power, a variator lens group II having a negative refractive power, a compensator lens group III having a negative refractive power, a relay lens group IV having a positive refractive power and an optical member P equivalent to the 3-color separation prism are arranged on a common optical axis O in this order from the front. S represents a diaphragm device of the invention.

Figure 3:
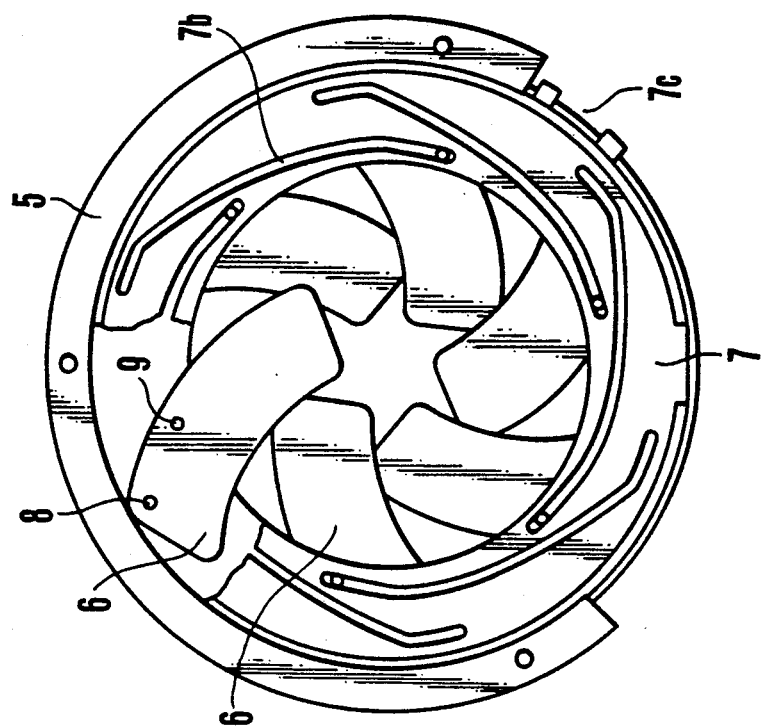
FIG. 3 is an elevational view as seen from a direction indicated by arrow A of FIG. 2.
Figure 2:
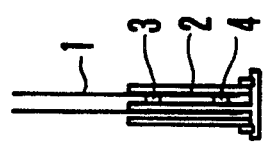
FIG. 2 is a longitudinal sectional view of an embodiment of a diaphragm device according to the invention.
Figure 2:
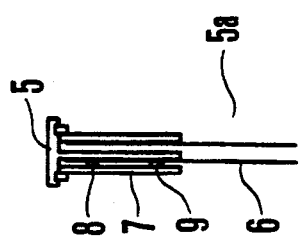
Figure 4:
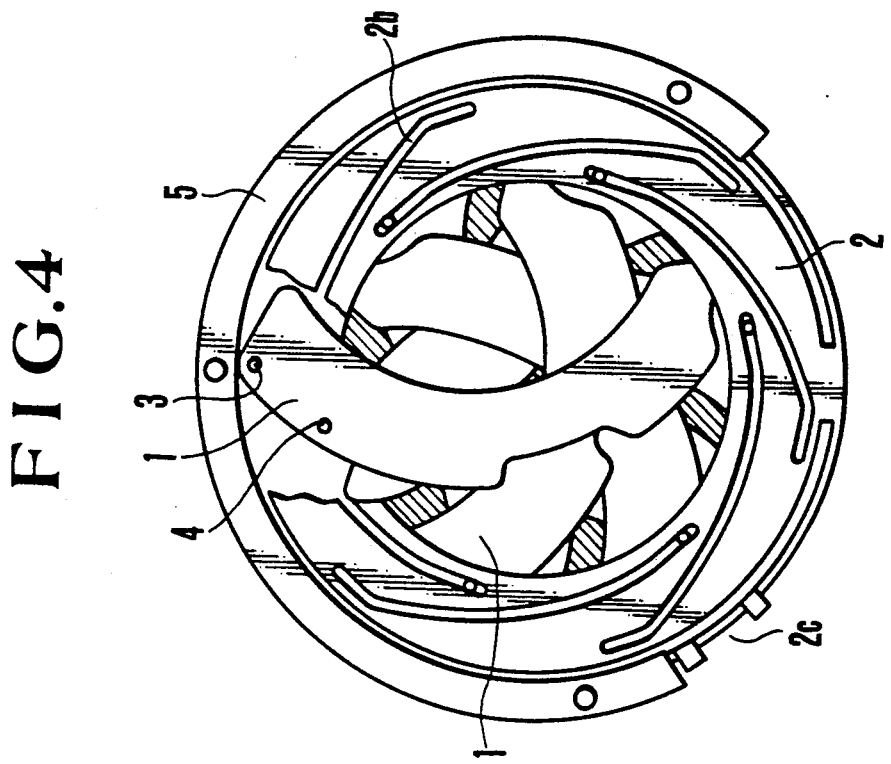
FIG. 4 is an elevational view as seen from the opposite direction ,indicated by arrow B of FIG. 2.

One embodiment of the diaphragm device according to the invention is shown in the longitudinal section view of FIG. 2 with FIG. 3 and FIG. 4 in its front and rear elevational views, respectively.

The present embodiment is constructed from a plurality of first diaphragm blades 1 for determining the diameter of the aperture opening, which constitute an aperture diameter determining diaphragm blade group as shown in FIG. 4, and a plurality of second diaphragm blades 6 for blocking light leaking from the other portions other than the aperture opening of the aperture diameter determining diaphragm blade group when fully stopped down, which constitute a light leakage preventing diaphragm blade group as shown in FIG. 3.

The plurality of (in this embodiment, six) first diaphragm blades 1 constituting the aperture diameter determining diaphragm blade group and the plurality of (in this embodiment, six) second diaphragm blades 6 constituting the light leakage preventing diaphragm blade group are arranged on opposite sides of a ring-shaped base plate 5 having a central round opening 5a in confronting relation to each other. Each of the first diaphragm blades 1 arranged on one side of the base plate 5 is formed to an arcuate shape of nearly constant width over the entire length thereof and has a fixed dowel 3 which serves as the center of rotation planted in the outer corner of one end thereof. For the aperture diameter determining diaphragm blade group, the base plate 5 is provided with a plurality of (six) first pivot holes (not shown) on a common circle in equally spaced relation, into which the respective fixed dowels 3 are rotatably fitted. Further, a rotating dowel 4 planted on each of the first diaphragm blades 1 is slidably fitted in a respective camming slot 2b of a first cam member 2. Therefore, by rotating the first cam member 2 about the optical axis relative to the base plate 5, all the first diaphragm blades 1 are turned about the respective dowels 3 at once and, as they superimpose one upon another, the diameter of the aperture opening is determined.

Incidentally, in the above-described prior known diaphragm device, the diaphragm blade gets progressively wider toward the base end side so that when the diaphragm is stopped down, the widened base portion can overlap the free end portions of the adjacent ones of the other diaphragm blades to thereby prevent light from leaking through the boundaries between the adjacent two of the diaphragm blades. In the present invention, however, the diaphragm blade 1 is made narrower in width than was heretofore possible and, moreover, its width is made nearly constant over the entire length when it is formed to the arcuate shape, so that a minimization of the outer diameter of the diaphragm device is achieved. When the aperture diameter determining diaphragm blades 1 are closed down, therefore, the adjacent two of the first diaphragm blades 1 do not entirely overlap each other, giving rise to a slit (indicated by hatching in FIG. 4), from which light will leak. For this reason, in the present embodiment, a constructional feature is provided that as the aperture diameter determining diaphragm blades move, the slits resulting from the failure of the entire overlapping of the plurality of diaphragm blades 1 except the aperture opening formed by them are covered by the light leakage preventing diaphragm blade group. That is, as shown in FIG. 3, the second diaphragm blades 6 arranged on the back side of the base plate 5 are formed to an arcuate shape of nearly constant width, and have fixed dowels 8 planted on one ends thereof, which are rotatably fitted in the respective ones of a plurality of (six) second pivot holes (not shown) bored in the base plate 5 on a common circle in equally spaced relation at different positions from those of the before-described first pivot holes. The second diaphragm blades 6 have also rotating dowels 9 formed thereon, which are slidably fitted in respective camming slots 7b of a second cam member 7. Here, the plurality of second pivot holes and the plurality of first pivot holes which lie in a common circle are located successively so as not to superimpose each other and also so as to be spaced from each other by an equal angular distance. By rotating the second cam member 7 about the optical axis relative to the base plate 5, all the second diaphragm blades 6 are turned about the respective fixed dowels 8 at once, covering all the vacancies except the aperture opening formed between the adjacent two of the closed down aperture diameter determining diaphragm blades 1. It should be noted that these second diaphragm blades 6 are formed to a shorter length than the first diaphragm blades 1 so that the former does not affect the diameter of the aperture opening defined by the latter.

It is to be noted that the first cam member 2 and the second cam member 7 are provided with recesses 2c and 7c formed in the outer peripheral portions thereof in axial alignment with each other. A diaphragm drive lever (not shown) engages these recesses 2c and 7c. When this diaphragm drive lever moves, the first cam member 2 and the second cam member 7 rotate at the same time. Hence, the aperture opening diameter determining diaphragm blade group and the light leakage preventing diaphragm blade group are made to move at the same time.

Therefore, according to the present embodiment, the width of the base end side of the first diaphragm blades for determining the diameter of the aperture opening can be reduced. Hence, the outer diameter of the whole diaphragm device can also be reduced. Also, the light leakage resulting from the use of a special shape of the first diaphragm blade can be prevented by the second diaphragm blades 6. Thus, the prescribed diaphragm effect can be obtained.

Figure 5:
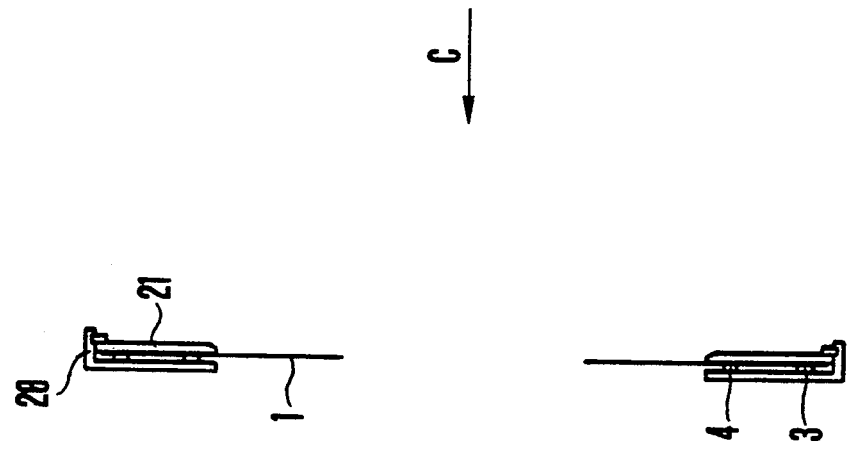
FIG. 5 is a longitudinal sectional view illustrating another embodiment of the invention.
Figure 6:
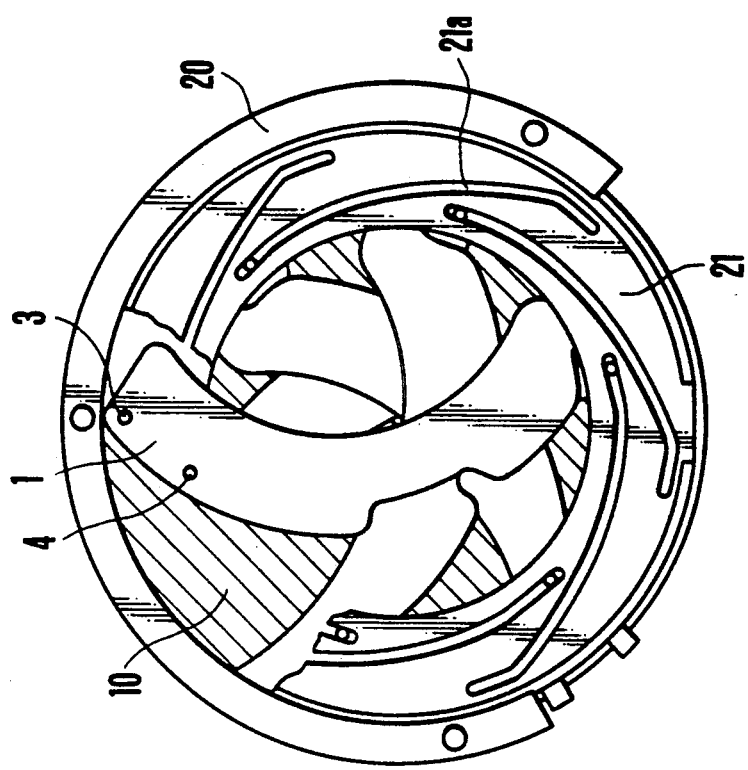
FIG. 6 is an elevational view as seen from a direction indicated by arrow C of FIG. 5.
Figure 10:
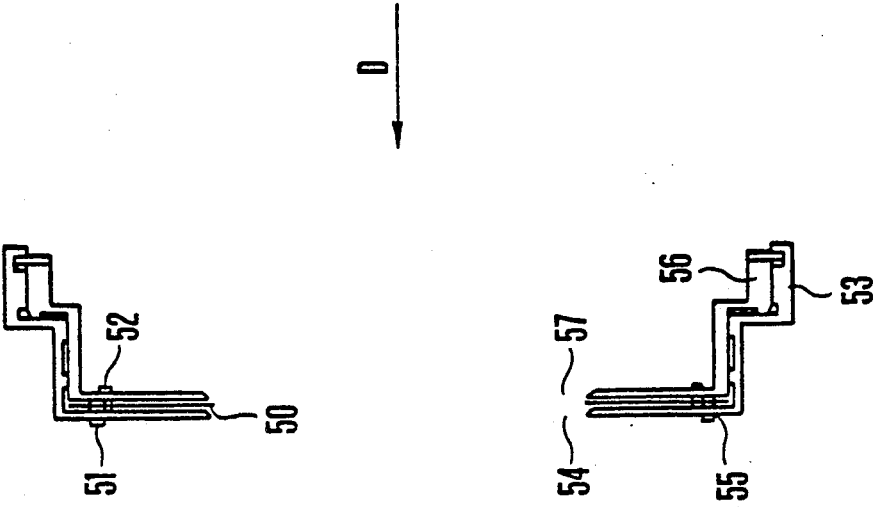
FIG. 10 is a longitudinal sectional view of the conventional diaphragm device.

FIG. 5 is a longitudinal sectional view of another embodiment and FIG. 6 is an elevational as seen looked from a direction of arrow C of FIG. 5.

In the above-described embodiment, the light leakage from the plurality of aperture opening diameter determining first diaphragm blades 1 is prevented by the light leakage preventing diaphragm blade group comprised of the plurality of second diaphragm blades 6. Thus, the present embodiment does not use the light leakage preventing diaphragm blade group when the light leakage of the aperture opening diameter determining diaphragm blade group comprised of the plurality of first diaphragm blades 1 is prevented. The first diaphragm blades themselves, similarly to the above-described embodiment, are arranged with their fixed dowels 3 rotatably fitted in respective pivot holes (not shown) of a base plate 20 and with their rotating dowels 4 slidably fitted in respective camming slots 21a of a cam member 21. Further, a light shielding web material 10 of expansion property (indicated by hatching in FIG. 6) is adhered between the outer periphery of each first diaphragm blade 1 and the inner periphery of the base plate 20. As the first diaphragm blades 1 move, the aperture opening takes any of the predetermined diameters, and at the same time the web material 10 is expanded and spread to prevent light leakage from the other area than the aperture opening.

As has been described above, according to the invention, it has been made possible to reduce the size of the diaphragm blade while still permitting prevention of light leakage from other than the aperture opening. This leads to a reduction in the outer diameter of the whole diaphragm device. Hence, an advantage of achieving a minimization of the size of the diaphragm device is produced. This can contribute to a reduction in the size and weight of, for example, the camera's lens barrel employing that diaphragm device.

Next, another embodiment in which a minimization of the size of the diaphragm device is achieved in such a manner that the shape of the aperture opening is made to approach a more perfectly round form.

Figure 7:
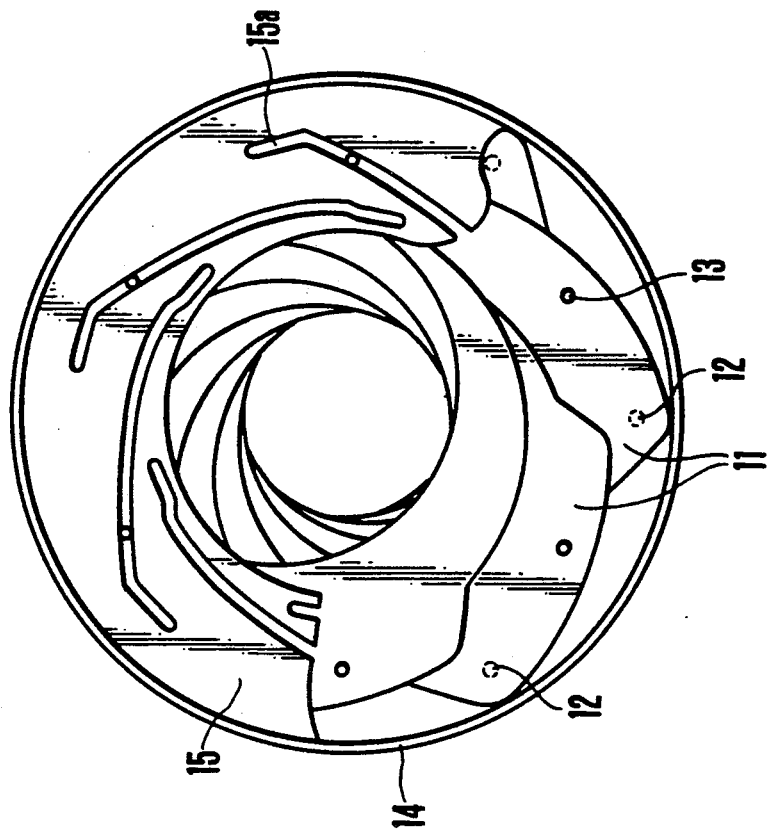
FIG. 7 and FIG. 8 are, respectively, an elevational view and a schematic sectional view of the main parts of a third embodiment of the invention.
Figure 8:
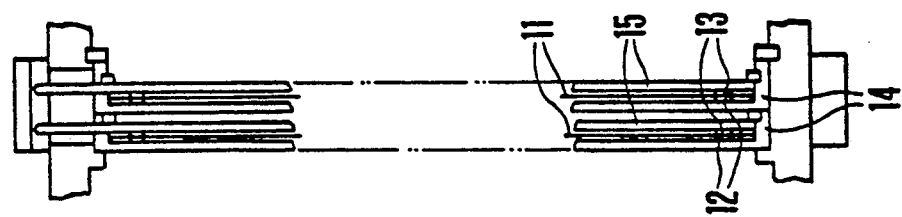
Figure 12:
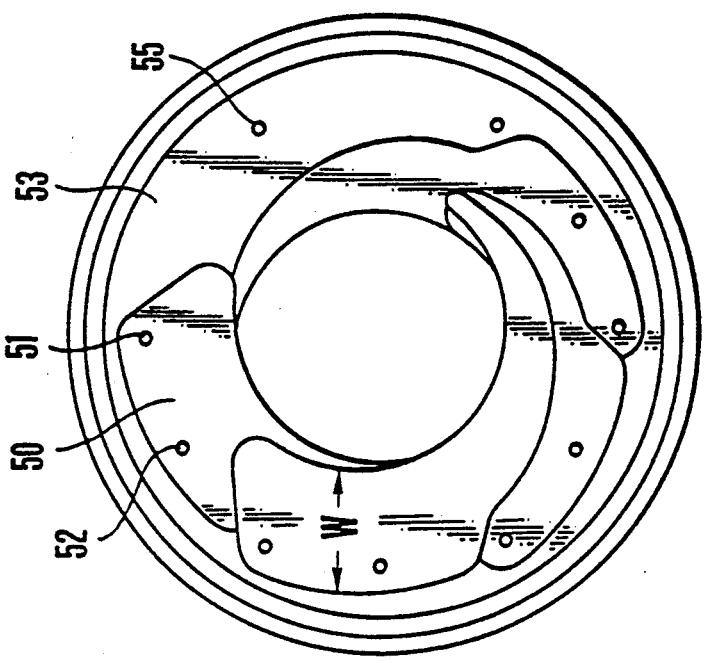
FIG. 12 is an elevational view illustrating the form of the diaphragm blade of FIG. 10.
Figure 11:
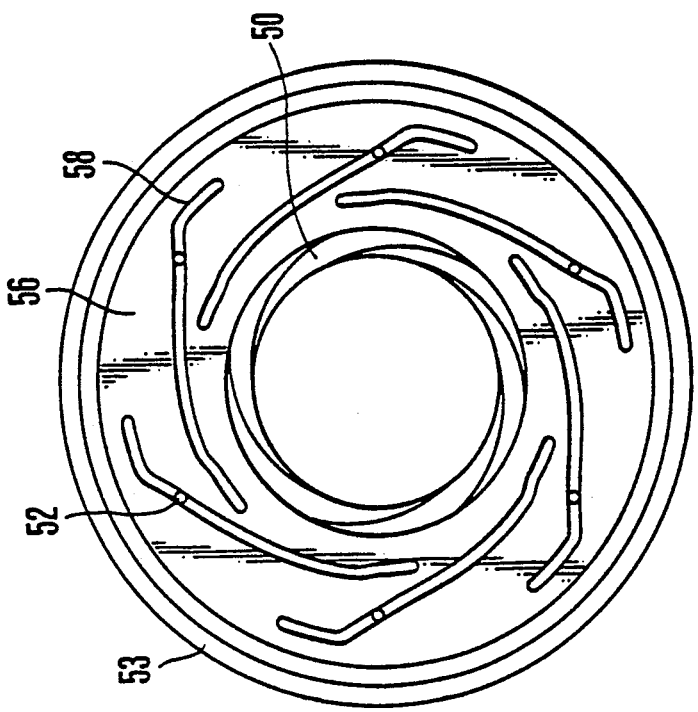
FIG. 11 is an elevational view as seen from a direction of arrow D of FIG. 10.

FIG. 7 is an elevational view of the main parts of a third embodiment of the invention. FIG. 8 is a schematic sectional view of FIG. 7.

In these figures, a plurality of diaphragm blades 11 of arcuate shape are superimposed one upon another.

A fixed dowel 12 is formed on one surface of each of the diaphragm blades 11 and functions as the center of rotation of the diaphragm blade 11. A rotating dowel 13 is formed on the opposite surface of each of the diaphragm blades 11 and functions as a guide pin when the diaphragm blade 11 turns.

A cam member 15 has a plurality of camming slots 15a formed through the surface wall thereof for sliding purposes of the rotating dowels 13.

In the present embodiment, a diaphragm member is constructed from the diaphragm blades 11 and the cam member 15.

A base plate 14 rotatably supports the diaphragm blades 11 at their fixed dowels 12.

In the present embodiment, when assembled with a photographic system, the base plate 14, the diaphragm blades 11 and the cam member 15 are put into positions in this order to make up a diaphragm means. Then, two of these diaphragm means are superimposed to constitute a diaphragm device.

And, at this time, the two diaphragm means are arranged in such angular displaced relation that their diaphragm blades alternate with each other in the circumferential direction, when one diaphragm device is established as a whole.

In the present embodiment, the operation of the diaphragm device is as follows. By rotating the two cam members 15 at the same time, all the diaphragm blades 11, as their rotating dowels 13 move along the camming slots 15a of the cam members 15, are turned about the fixed dowels 12 to a predetermined amount. And, the thus-turned diaphragm blades 11 overlap one upon another to an extent, by which the diaphragm is closed down to a predetermined aperture value.

It is to be noted that in the present invention the cam members 15 may otherwise be fixedly secured, while the based plate 4 is made able to turn. Even in this case, a similar result can be effected.

Figure 9:
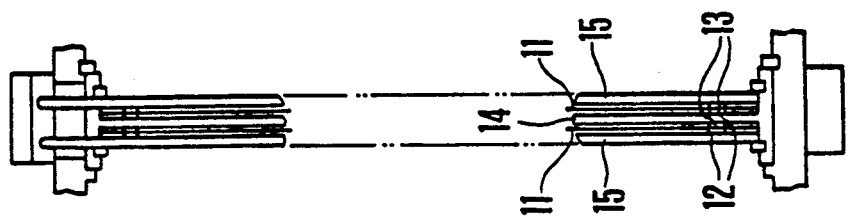
FIG. 9 is a schematic sectional view of a fourth embodiment of the invention.

FIG. 9 is a sectional view of the main parts of a fourth embodiment of the invention.

In the same figure, the like elements to those shown in FIG. 8 are denoted by the same reference numerals.

In the present embodiment, the diaphragm member, comprised of the cam member 15 and the diaphragm blades 11, is arranged two in number in symmetric relation with respect to the base plate 14 so that the two diaphragm members share one common base plate 14 with each other. In such a manner, the diaphragm device is constructed with inclusion of only one base plate 14 on which the front and rear diaphragm blade groups both are rotatably supported with an advantage that the structure of construction of the whole device is simplified.

To operate the diaphragm device, similarly to the third embodiment, the two cam members 15 are rotated at the same time, thereby turning all the diaphragm blades 11 about the fixed dowels 12 as their rotating dowels 13 move along the respective camming slots 15a of the cam members 15. The thus-turned diaphragm blades 11 superimpose one upon another to an extent by which the diaphragm is closed down.

Though in the above-described embodiments, two diaphragm members have been laminated, it is to be understood that three or more diaphragm members may be laminated when one diaphragm devices is constructed. Also, two of the diaphragm device of such construction as shown in FIG. 9 may be used in axial alignment. As a whole, four diaphragm members constitute a diaphragm device.

According to the above embodiment, as has been described before, a plurality of diaphragm members each having a cam member and diaphragm blades are laminated in the axial direction of the photographic system by utilizing the base plate when one diaphragm device is constructed, and a plurality of diaphragm blades are made to rotate by one cam member. Thereby, the number of camming slots machined in one cam member is reduced with an advantage that the performance is kept good. Moreover, the number of diaphragm blades can be increased without causing an increase of the outer diameter of the diaphragm device, so that the shape of the aperture opening nears a perfect round when the diaphragm is largely closed down. Thus, a diaphragm device suited to the objective lens system for a photographic camera or a video camera can be achieved.

What is claimed is:

1. A diaphragm device comprising:
    a base plate having a substantially round central opening;
    first diaphragm blades, each having a protruding portion, each of which is pivotally supported at its one end by said base plate;
    a first member having an opening, being of a ring-like shape, and having a plurality of cam grooves for guiding said protruding portions for causing each of said first diaphragm blades to pivotally rotate;
    second diaphragm blades, each having a protruding portion, arranged opposite to said first diaphragm blades and having the same number as that of said first diaphragm blades, each of said second diaphragm blades being pivotally supported at its one end by said base plate; and
    a second member having a round opening, being of a ring-like shape, and having a plurality of cam grooves for guiding said protruding portions for causing each of said second diaphragm blades to pivotally rotate.

2. A diaphragm device according to claim 1, wherein first pivots corresponding to said first diaphragm blades are located on a common circle, and wherein second pivots corresponding to said second diaphragm blades are located on a common circle, each of said first pivots and each of said second pivots being offset from each other.

3. A diaphragm device according to claim 2, wherein said first diaphragm blades form an opening that determines the F-number and said second diaphragm blades are moved by said second member so as to block light leaking from portions other than the aperture opening when said first diaphragm blades are closed down.

4. An objective lens system having a diaphragm therein, comprising:
    an objective lens having a plurality of lenses for forming an image; and
    diaphragm means arranged in at least one lens spacing to form an opening that determines the F-number;
    said diaphragm means including:
    a plurality of diaphragm blades for determining an aperture opening, in which said diaphragm blades, when moving toward an optical axis of said objective lens while forming the aperture opening, produce portions on which said blades do not superimpose in the other places than the aperture opening; and a member arranged to move so as to cover said portions wherein said member is adhered to each of said diaphragm blades and made of a material having an expansion property.

5. An objective lens system having a diaphragm incorporated therein, comprising:

an objective lens having a plurality of lenses for forming an image; and diaphragm means arranged in at least one lens spacing to form an opening that determines the F-number; said diaphragm means including:

a base plate having a substantially round central opening with its center at an optical axis of said objective lens;

first diaphragm blades, each having a protruding portion, each of which is pivotally supported at its one end by said base plate;

a first member having an opening, being of a ring-like shape, and having a plurality of cam grooves for guiding said protruding portions for causing each of said first diaphragm blades to pivotally rotate;

second diaphragm blades, each having a protruding portion, arranged opposite to said first diaphragm blades and having the same number as that of said first diaphragm blades, each of said second diaphragm blades being pivotally supported by said base plate; and a second member having a round opening, being of a ring-like shape, and having a plurality of cam grooves for guiding said protruding portions for causing each of said second diaphragm blades to pivotally rotate.

6. A system according to claim 5, wherein first pivots corresponding to said first diaphragm blades are located on a common circle, and wherein said second pivots corresponding to said second diaphragm blades are located on a common circle, each of said first pivots and each of said second pivots being offset from each other.

7. A system according to claim 6, wherein said first diaphragm blades form an opening that determines the F-number and said second diaphragm blades are moved by said second member so as to block light leaking from portions other than the aperture opening when said first diaphragm blades are closed down.

* * * * *

UNITED STATES PATENT AND TRADEMARK OFFICE
CERTIFICATE OF CORRECTION

PATENT NO. : 5,072,249  Page 1 of 2

DATED : December 10, 1991

INVENTOR(S) : Setsuo YOSHIDA

It is certified that error appears in the above-identified patent and that said Letters Patent is hereby corrected as shown below:

COLUMN 2,
- Line 19, ",indicated" should read --indicated--;
- Line 52, "section" should read --sectional--; and
- Line 60, "other" should be deleted.

COLUMN 3,
- Line 54, "before-described" should read --above-described--.

COLUMN 4,
- Line 26, "elevational as seen looked" should read --elevational view as seen--; and
- Line 50, "other area" should read --area other--.

COLUMN 5,
- Line 39, "based plate 4" should read --base plate 14--;
- Line 67, "devices" should read --device--; and
- Line 68, "device" should read --devices--.

COLUMN 6,
- Line 17, "round" should read --circle--.

UNITED STATES PATENT AND TRADEMARK OFFICE
CERTIFICATE OF CORRECTION

PATENT NO. : 5,072,249

DATED : December 10, 1991

INVENTOR(S) : Setsuo Yoshida

It is certified that error appears in the above-identified patent and that said Letters Patent is hereby corrected as shown below:

Column 8, line 14, "said second pivots" should read --second pivots--.

Signed and Sealed this

Twenty-seventh Day of April, 1993

*Attest:*

MICHAEL K. KIRK

*Attesting Officer*     Acting Commissioner of Patents and Trademarks